(12) United States Patent
Haydon

(10) Patent No.: US 6,354,190 B1
(45) Date of Patent: Mar. 12, 2002

(54) BEVERAGE MAKING APPARATUS

(76) Inventor: James Andrew Haydon, Valley Villa, Three Mile Water, Wicklow, County Wicklow (IE)

( * ) Notice: Subject to any disclaimer, the term of this patent is extended or adjusted under 35 U.S.C. 154(b) by 0 days.

(21) Appl. No.: 09/601,904

(22) PCT Filed: Feb. 10, 1999

(86) PCT No.: PCT/IE99/00009

§ 371 Date: Aug. 9, 2000

§ 102(e) Date: Aug. 9, 2000

(87) PCT Pub. No.: WO99/40829

PCT Pub. Date: Aug. 19, 1999

(30) Foreign Application Priority Data

Feb. 10, 1998 (GB) ............................................. 9802705

(51) Int. Cl.⁷ ................................................. A47J 31/02
(52) U.S. Cl. ............................ 99/323; 99/295; 99/316; 206/217; 206/219; 426/79; 426/120
(58) Field of Search ......................... 99/295, 316, 323; 426/120, 119, 79; 206/220, 221, 119, 217; 220/201, 33.1; 215/DIG. 8

(56) References Cited

U.S. PATENT DOCUMENTS

| 2,073,273 | A | * | 3/1937 | Wetstein ...................... 426/120 |
| 2,120,860 | A | * | 6/1938 | Ehlers ....................... 99/306 X |
| 4,779,722 | A | * | 10/1988 | Hall ........................... 206/221 |
| 4,886,674 | A | * | 12/1989 | Seward et al. ................ 426/79 |

FOREIGN PATENT DOCUMENTS

| CH | 349388 | 11/1960 |
| DE | 2622216 | 12/1977 |
| JP | 58101645 | 6/1983 |
| WO | 9507648 | 3/1995 |

* cited by examiner

Primary Examiner—Reginald L. Alexander
(74) Attorney, Agent, or Firm—Price and Gess

(57) ABSTRACT

A beverage making apparatus includes a container having a pair of compartments. Water can be inserted into the receptacle to interact with ingredients within the compartments. A release structure permits the contents of one compartment to be mixed with the other compartment and the release structure can include a water soluble barrier member that can dissolve to permit a mixing of the ingredients and to provide a drinkable beverage exiting from the container.

20 Claims, 7 Drawing Sheets

BEVERAGE MAKING APPARATUS

BACKGROUND OF THE INVENTION

1. Field of the Invention

The present invention relates to a beverage making apparatus, in particular an apparatus for making a beverage from a number of ingredients.

2. Description of Related Art

In the catering industry there is a considerable demand for beverages made from a plurality of ingredients which can only be mixed and prepared when ordered. One example of such a beverage is that known as "Irish Coffee" in which the ingredients are coffee, sugar, boiling water, a measure of Irish whiskey and a topping of cream. Making a good "Irish Coffee" requires the person making the beverage to take sufficient time and care to measure the ingredients, to blend and mix them sufficiently and in the correct fashion. Prevailing methods and practice are complicated, time consuming, and labour intensive. In fact many of today's catering assistants lack the necessary skill and training, which in turn leads to many inaccurate and inconsistent recipes for the same beverage. While this specification has considered the problem of producing Irish coffees, the same situation arises with many other beverages which have a number of ingredients, especially those involving an alcoholic component.

The present invention seeks to alleviate the problems of making beverages from a plurality of ingredients.

SUMMARY OF THE INVENTION

Accordingly, the present invention provides a beverage making apparatus comprising a receptacle, a first compartment within the container for holding a required quantity of a first constituent ingredient or ingredients, a second segregated compartment within the container for holding a required quantity of a second constituent ingredient or ingredients, each compartment having a separate release means for allowing the contained ingredient or ingredients to be released into a separate vessel located underneath the container, the second compartment being adapted to house a liquid in a segregated and sealed manner, the release means comprising an element which is removable, releasable or breakable to allow the contents of the second compartment to be added to the liquid formed from the first compartment.

Advantageously, the first compartment is adapted to house a dry or a desiccated ingredient or ingredients and the release means comprises two filter membranes located above and below the housed ingredients, whereby boiling water added to the container permeates through the filter membranes to filter the contents of the first compartment to make a quantity of liquid such as coffee.

Conveniently, the release means for the second compartment is remotely operable.

Preferably, the first compartment is located at the base of the container and the second compartment is located about the first compartment.

Conveniently, the second compartment is an annular shaped construction and the first compartment is located in the centre of the annulus.

Conveniently, an indication is provided on the inner wall of the container so as to provide a mark for the level of boiling water required to be put into the container.

Advantageously, the boiling water added to the apparatus also preheats the liquid sealed in the second compartment.

Preferably, the second compartment is a container having an exit orifice for the liquid contained within it, and the release means comprises a plug of material which is capable of being melted or removed through the action of a hot or boiling liquid acting on the plug.

Preferably, the container has a lid having one or more formations for directing the flow of hot or boiling liquid towards the orifice.

Preferably, the container is housed within the receptacle beneath the first compartment in a manner which allows the liquid to flow from the container when the orifice is open.

The invention will hereinafter be more particularly described with reference to the accompanying drawings which show by way of example, two embodiments of a beverage making apparatus according to the invention.

DESCRIPTION OF THE PREFERRED EMBODIMENTS

Figure 1:
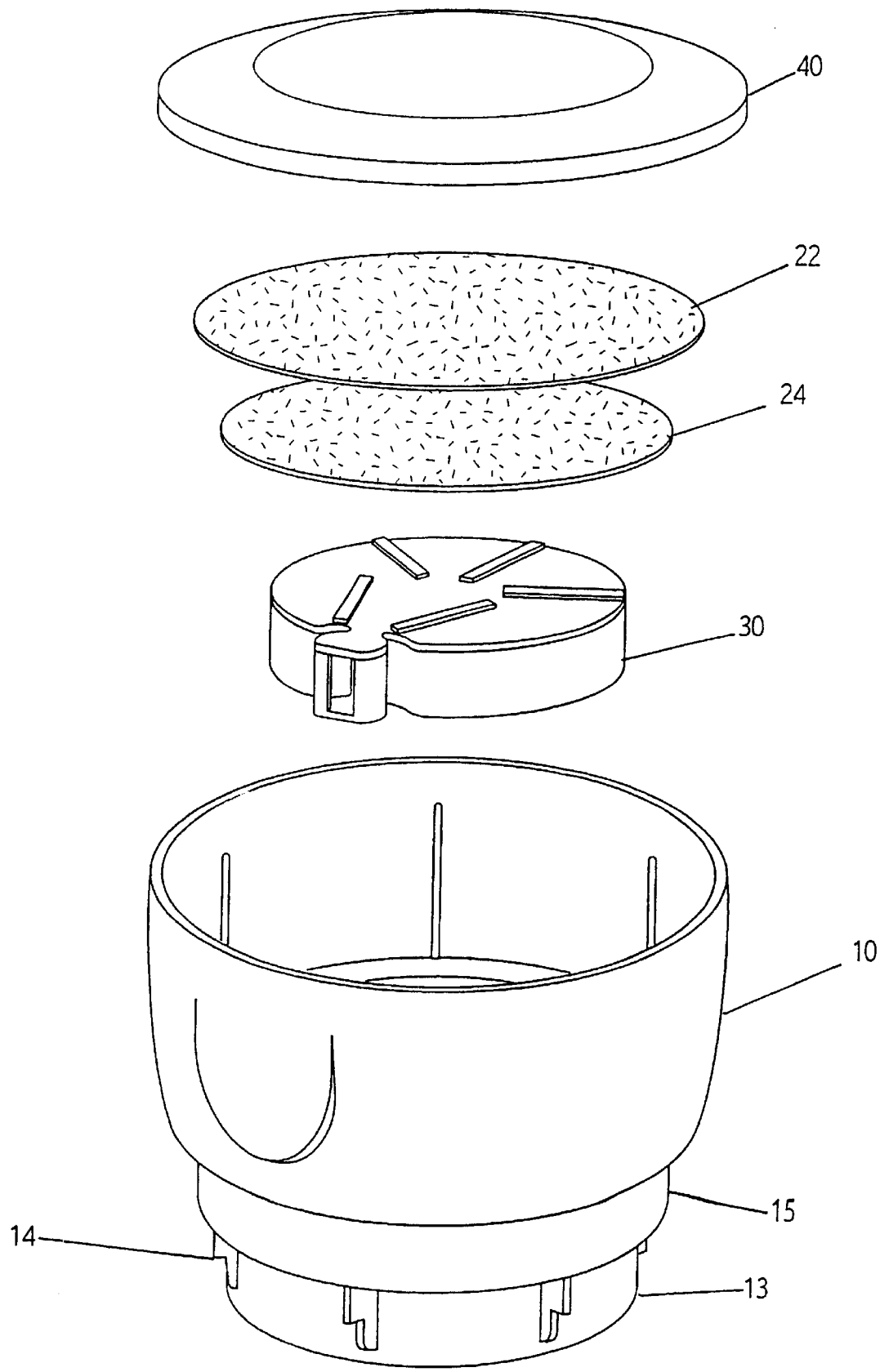
FIG. 1 is an exploded perspective view of a first embodiment of beverage making apparatus.
Figure 2:
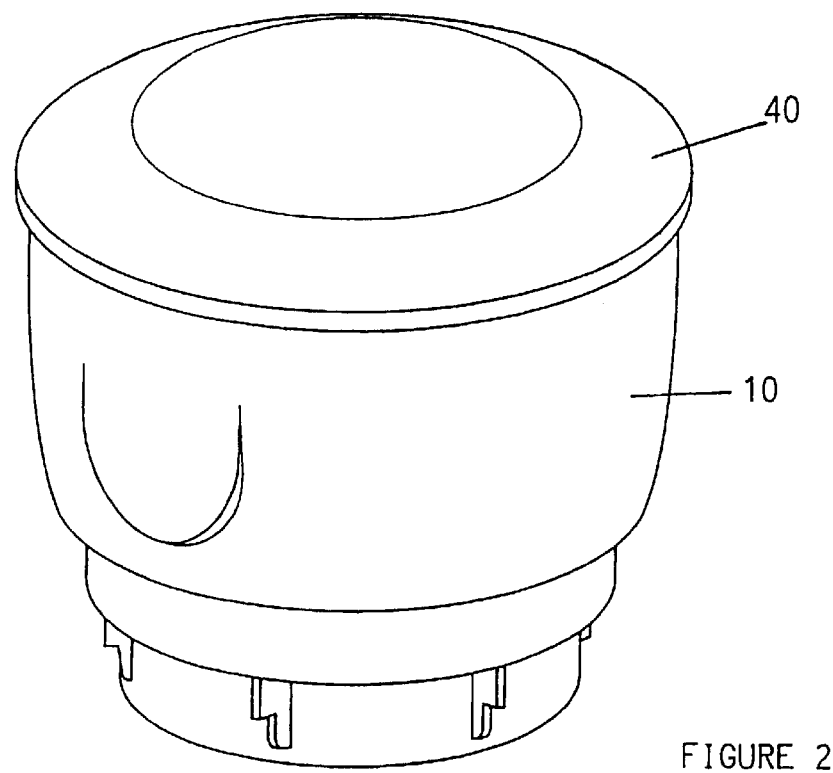
FIG. 2 is a perspective view of the assembled first embodiment.

Referring to the drawings and initially to FIGS. 1 to 12 of the drawings, the first embodiment of beverage making apparatus of the invention comprises a receptacle 10, a container 30 for housing a liquid (C) such as a measure of Irish whiskey and a compartment 20 for housing dry ingredients such as sugar (A) and coffee (B) between two filters 22,24 which define the compartment, and a lid 40.

Figures 4, 5:
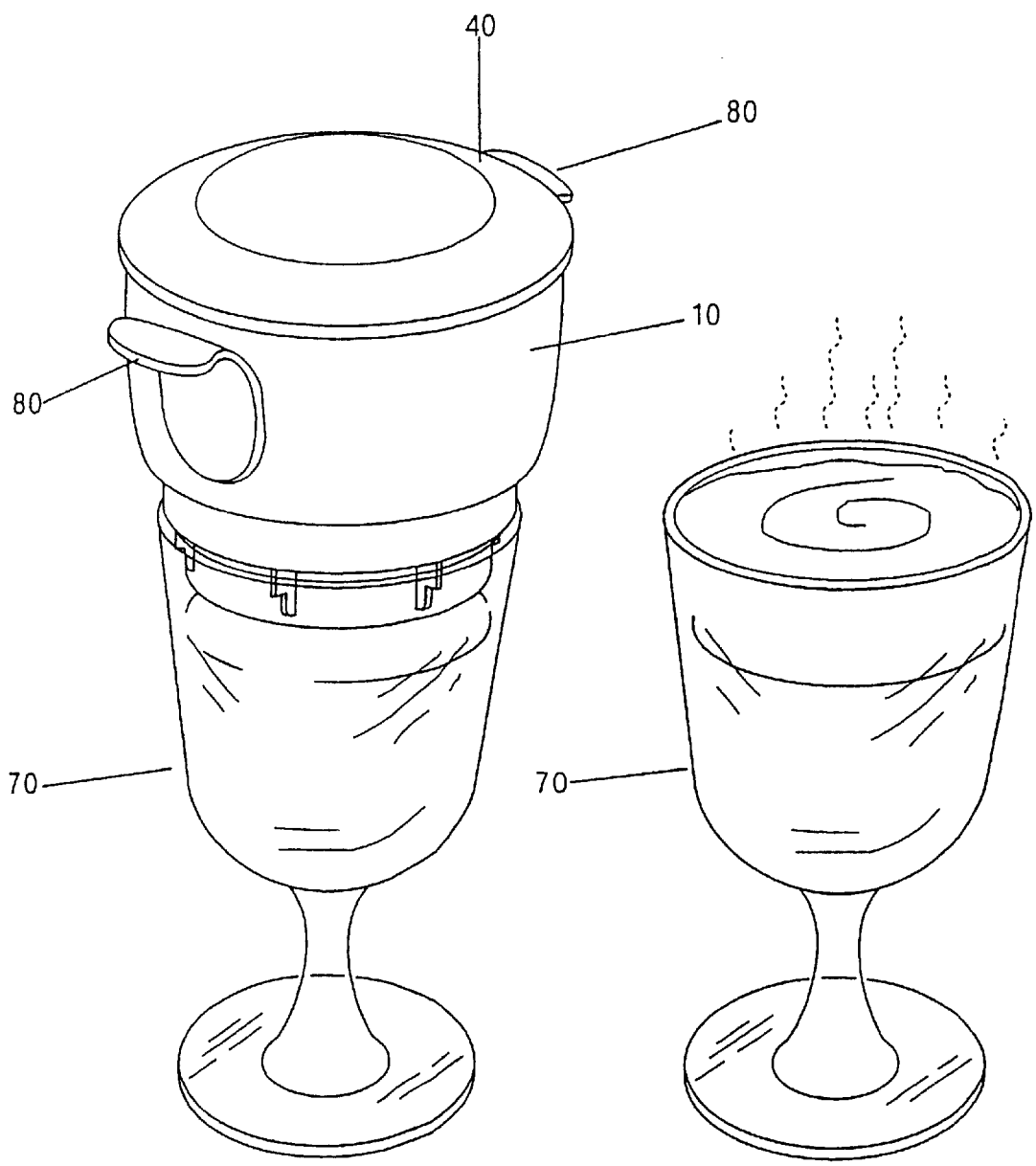
FIG. 4 is a perspective view of the apparatus of FIG. 3 mounted on a glass for the preparation of a beverage and FIG. 5 is a perspective view of the glass and completed beverage.
Figure 6:
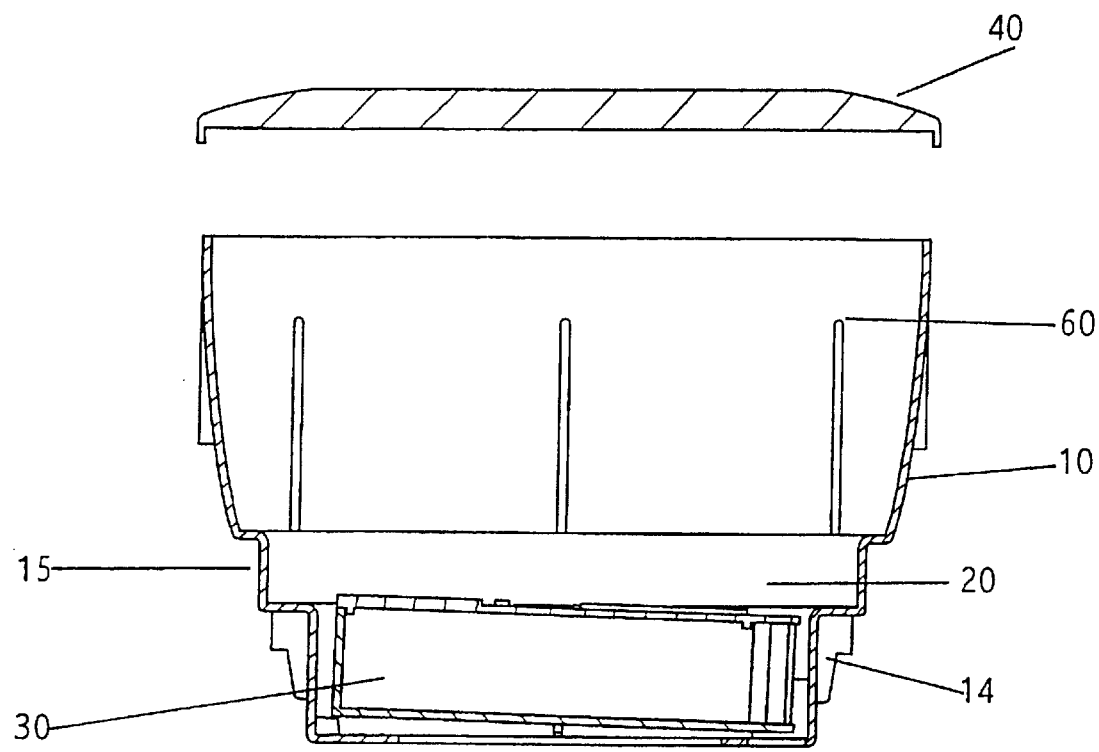
FIG. 6 is a cross-sectional side view of the apparatus showing the main receptacle, the lid and a container for liquid.
Figure 7:
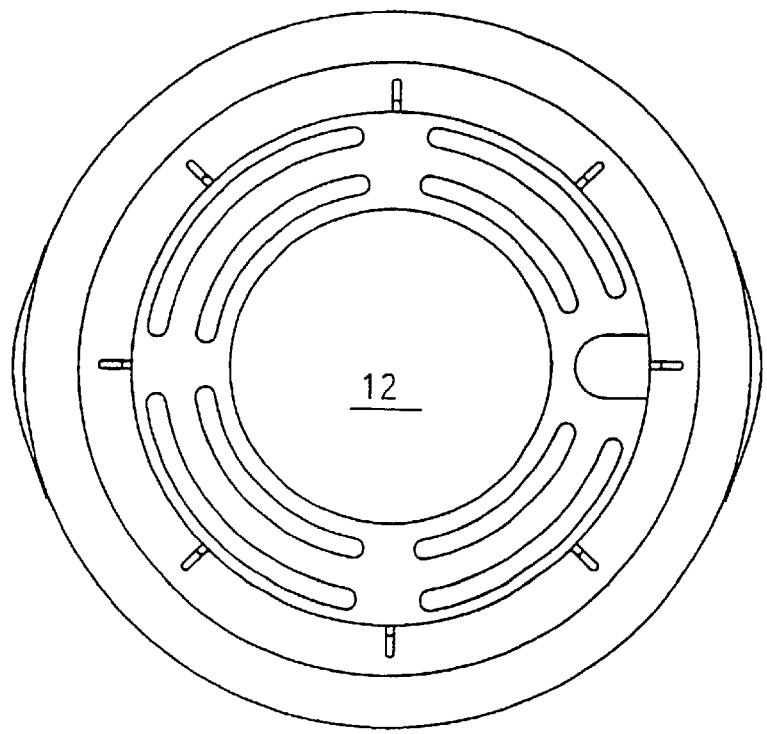
FIG. 7 is a plan view of the main receptacle.
Figure 8:
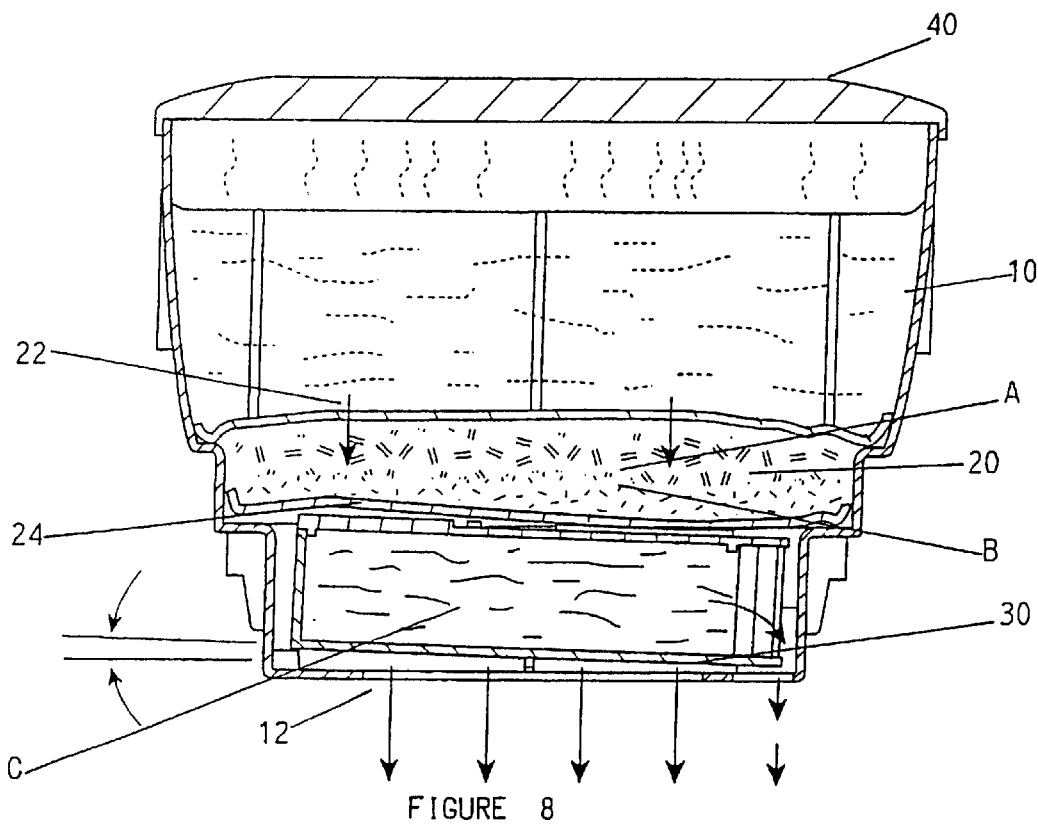
FIG. 8 is a cross-sectional side view through the apparatus showing the individual components and ingredients.
Figure 9:
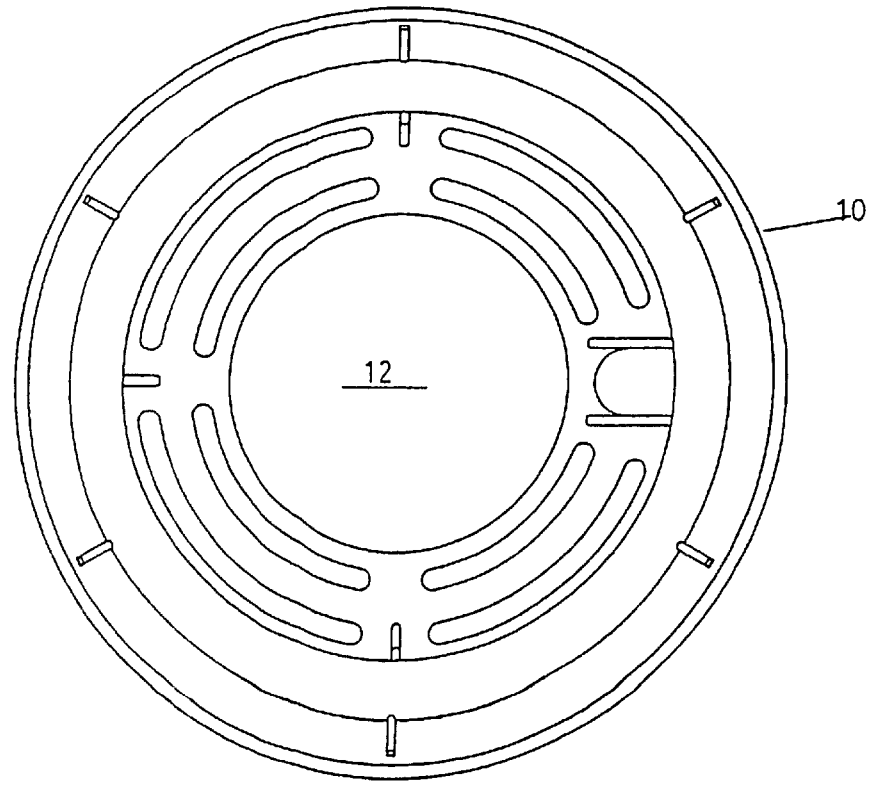
FIG. 9 is an underneath plan view of the receptacle.
Figure 10:
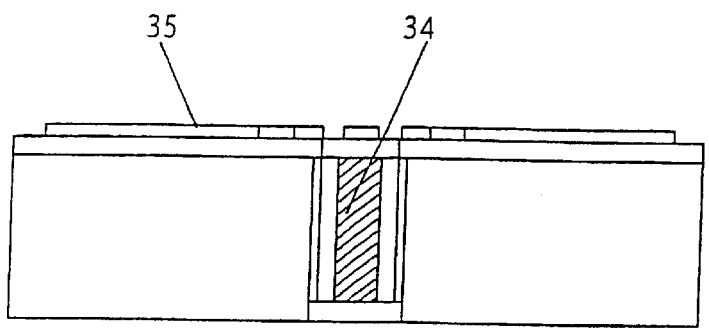
FIG. 10 is an elevation view of the container for liquid.
Figure 11:
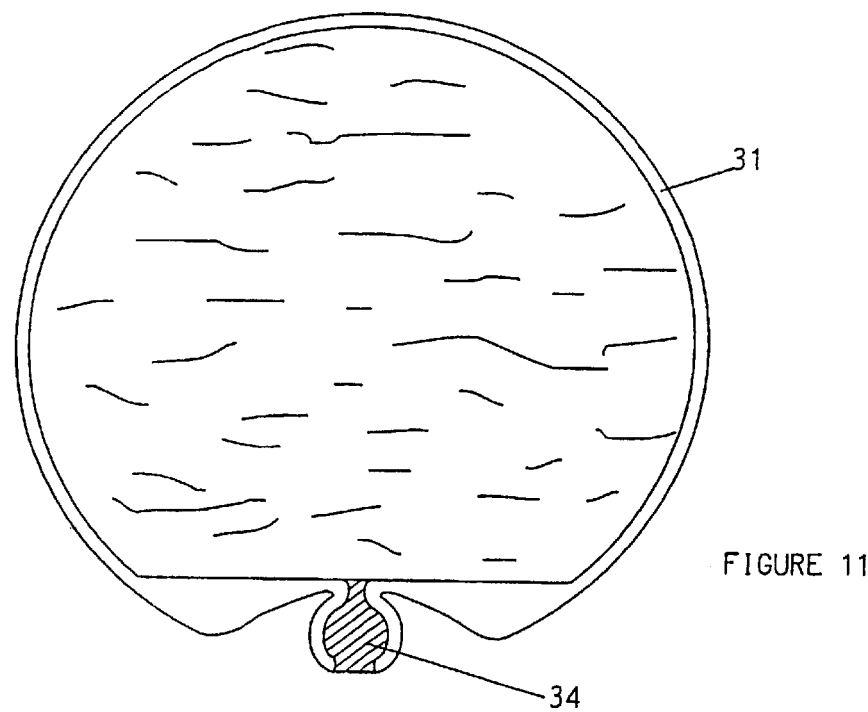
FIG. 11 is a cross sectional plan view.
Figure 12:
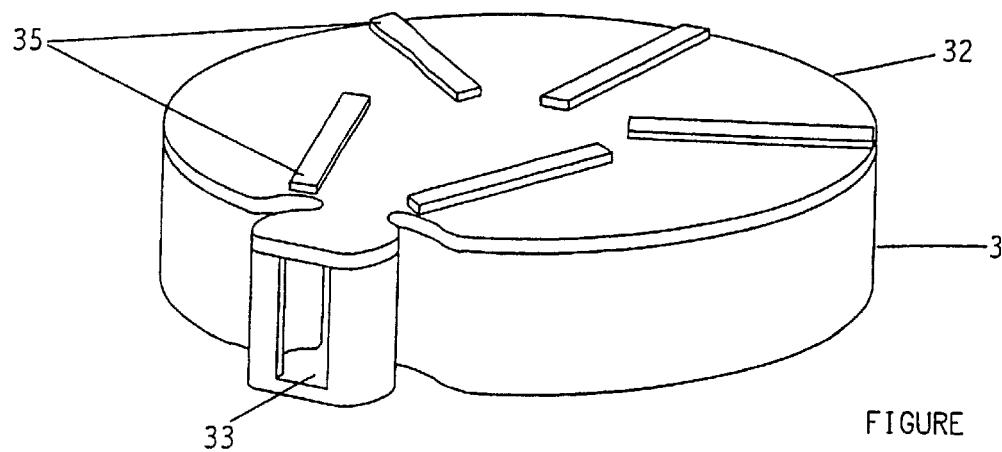
FIG. 12 is a perspective view of the container.

The receptacle 10 is generally cylindrical in shape and has an open bottom 12 through which liquid can easily pour. The bottom portion 13 of the receptacle 10 is narrower in diameter and has a number of locating fingers 14 which help to locate the receptacle on a glass 70 (as shown in FIG. 4). A mid region 15 of the receptacle outlines the volume occupied by compartment 20 which is bounded by an upper membrane 22 and a lower membrane 24. A fill mark 60 is provided on the wall of the receptacle to indicate the desired level of the optimum amount of boiling water which is required to be poured into the receptacle. The container 30 includes a compartment 31 for the liquid, such as whiskey and a lid 32 which is secured on the compartment 31. The liquid is released through orifice 33 which is sealed by a plug 34 which is manufactured from a substance which quickly melts when exposed to boiling or hot water and does not interfere with the flavour of the finished product. The plug 34 can be manufactured from a substance such as chocolate. The container 30 when installed in the receptacle 10 is inclined at a slight angle so that when the plug 34 is removed the liquid in the container flows towards the orifice 33. The upper surface of the lid 32 includes a series of formations 35 which channel the liquid falling on the lid 32 towards the orifice 33.

Figure 3:
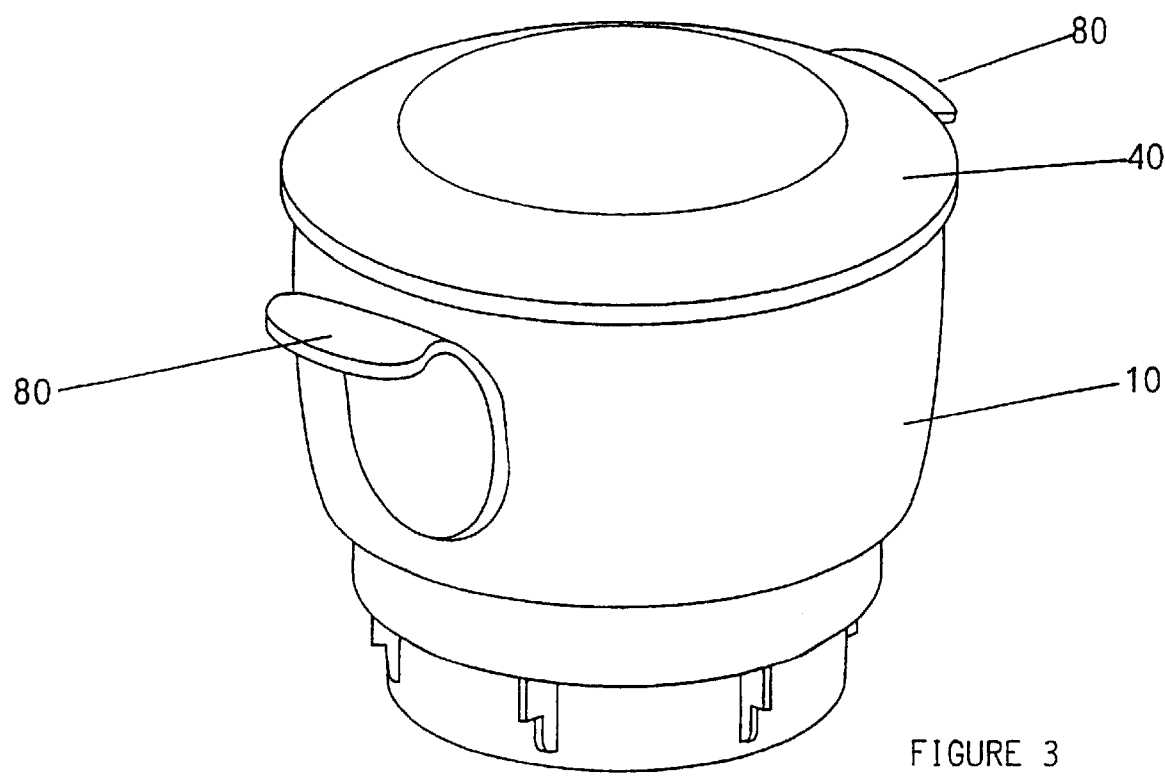
FIG. 3 is also a perspective view showing a modification of the first embodiment of apparatus with a pair of handles for ease of use.

A modified receptacle 10 is shown in FIGS. 3 and 4 which has a pair of handles 80 for ease of handling.

Figure 13:
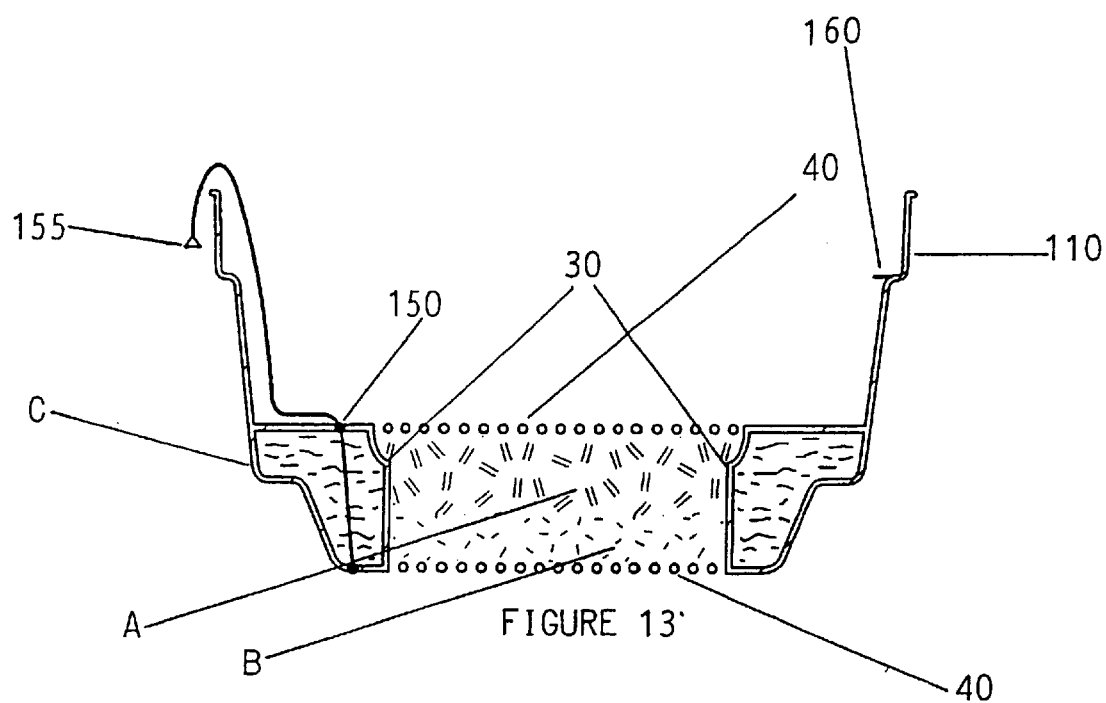
FIG. 13 is a cross-sectional side view through the second embodiment of the beverage making apparatus.
Figure 14:
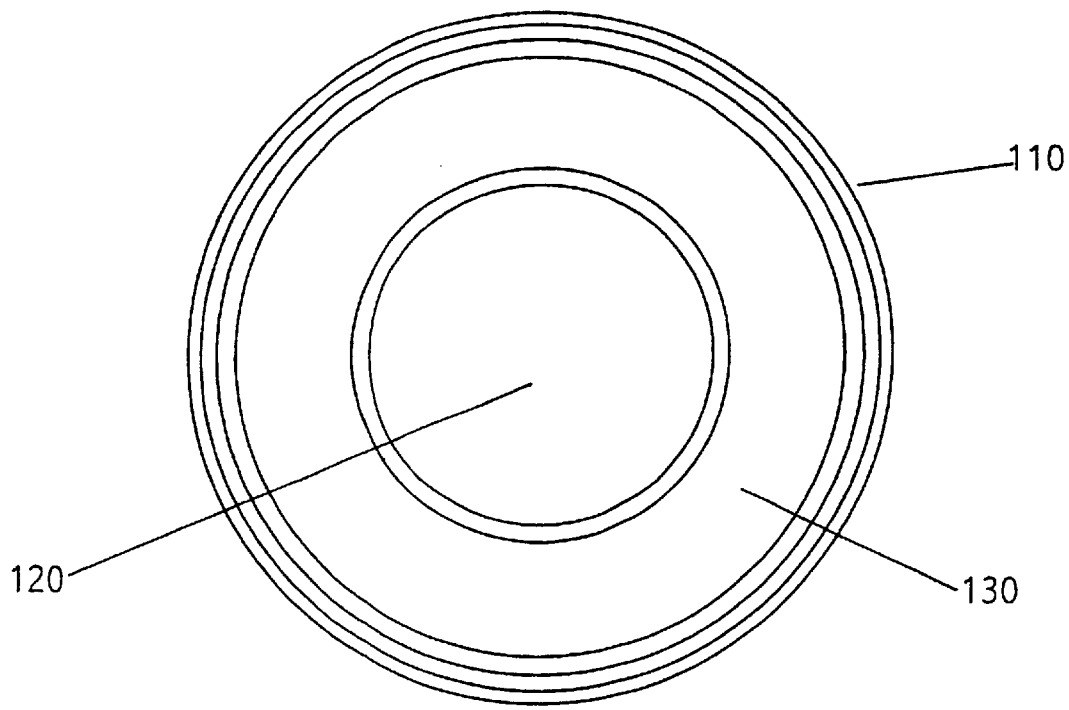
FIG. 14 is a plan view of the second embodiment of the apparatus.

Referring to the FIGS. 13 and 14 of the drawings, the second embodiment of beverage making apparatus comprises a receptacle 110, a first compartment 120 for housing dry ingredients, such as sugar (A) and coffee (B), and a second compartment 130 for housing liquid such as a measure of Irish whiskey (C) or other spirit. The second compartment 130 is annular in shape and is located about and segregated from the first compartment 120. The configuration of the compartment 30 while described as being annular, may also be in other parallelotropic forms.

The first compartment 120 is closed off from the rest of the receptacle by a paper filter membrane 140 at its top and bottom, which serves the dual function of securing the ingredients (A) and (B) in place and acting as a filtration system.

The second compartment 130 is closed off by sealing plugs 150 which can be removed by pulling on an elongate mechanism 155. A level indicating marker 160 is provided on the inner wall of the container, so as to indicate how far up the container should be filled with boiling water.

Using either of the embodiments of the apparatus of the invention, a hot beverage such as an Irish coffee is made in a simple and straightforward manner requiring little training. The only additional piece of equipment required is a kettle to produce the required boiling water.

The receptacle 10 or 110 is supplied to the user with the required amount of fresh filter coffee and brown sugar in compartment 20 or 120. A measure of Irish whiskey is supplied in the container in compartment 30 or 130. A separate sealed container (not shown) of long life cream is also supplied with the receptacle 10 or 110. The cream is supplied pre-whipped to the correct consistency to ensure that it will float on the prepared beverage.

To prepare such a beverage in the conventional manner requires some ten different articles and fifteen different actions. To prepare the same using the apparatus of the invention requires only three, 1: boiling water, 2: complete receptacle 10 or 110 including cream, 3: a glass or recipient vessel. To prepare a beverage such as an Irish coffee, the user pours boiling water into the receptacle 10 or 110 up to the level mark 60 or 160. The water permeates and filters through the compartment 20 or 120 to form a coffee/sugar infusion in the vessel (not shown) located underneath the container 10. The lid 40 is placed over the container at this stage to retard the filtration process and aid temperature retention. During the filtration process, the spirit in the compartment 30 or 130 is conveniently pre-heated. During the filtration process the pre-warmed whiskey is released into the recipient vessel by melting the plug 34 or using the remote release mechanism, to infuse with the coffee mixture, this adds significantly to the temperature of the finished beverage. To complete the presentation, all that is required is the addition of the cream supplied for a perfect finished product.

The advantages offered by the apparatus of the invention are that it is easy to use, clean and tidy to use, it is also labour efficient and offers quality with consistency of product, it can easily be stored and transported, has a good shelf life and is easily accessible to accurate stock control. Being inexpensive to produce, the units are regarded as disposable after use but can be recycled.

The beverage making apparatus can be used or sold in hotels and restaurants, bars, off-licences, airlines, railway and shipping catering, supermarkets, duty-free installations and for corporate entertaining. The beverage making apparatus may be sold individually, or in multiple packs.

It is to be understood that the invention is not limited to the specific details prescribed above which are given by way of example only and that various modifications and alterations are possible without departing from the scope of the invention as defined in the appended claims.

What is claimed is:

1. A beverage making apparatus for receiving a liquid comprising a receptacle, a first compartment within the receptacle for holding a required quantity of a first constituent ingredient or ingredients to receive the liquid, a second segregated compartment within the receptacle for holding a required quantity of a second constituent ingredient or ingredients, each compartment having a separate release means for allowing the contained ingredient or ingredients to be released into a separate vessel located underneath the container, the second compartment being adapted to house a liquid in a segregated and sealed manner, the release means comprising an element which is removable, releasable or breakable to allow the contents of the second compartment to be added to the liquid formed from the first compartment, the second compartment is a container having an exit orifice for the liquid contained within it, and the release means comprises a plug of material which is capable of being melted or removed through the action of a hot or boiling liquid acting on the plug.

2. A beverage making apparatus as claimed in claim 1, in which the release means for the second compartment is remotely operable.

3. A beverage making apparatus as claimed in claim 1, in which the first compartment is located at the base of the container and the second compartment is located about the first compartment.

4. A beverage making apparatus as claimed in claim 1, in which the second compartment is an annular shaped construction and the first compartment is located in the centre of the annulus.

5. A beverage making apparatus as claimed in claim 1, in which an indication is provided on the inner wall of the container so as to provide a mark for the level of boiling water required to be put into the container.

6. A beverage making apparatus as claimed in claim 1, in which the boiling water added to the apparatus also preheats the liquid sealed in the second compartment.

7. A beverage making apparatus as claimed in claim 1 in which the container has a lid having one or more formations for directing the flow of hot or boiling liquid towards the orifice.

8. A beverage making apparatus as claimed in claim 1 in which the container is housed within the receptacle beneath the first compartment in a manner which allows the liquid to flow from the container when the orifice is open.

9. A beverage making apparatus as claimed in claim 7 which the container is housed within the receptacle beneath the first compartment in a manner which allows the liquid to flow from the container when the orifice is open.

10. A beverage making apparatus for receiving a liquid comprising a receptacle, a first compartment within the receptacle for holding a required quantity of a first constituent ingredient or ingredients to receive the liquid, a second segregated compartment within the receptacle for holding a required quantity of a second constituent ingredient or ingredients, each compartment having a separate release means for allowing the contained ingredient or ingredients to be released into a separate vessel located underneath the container, the second compartment being adapted to house a liquid in a segregated and sealed manner, the release means comprising an element which is removable, releasable or breakable to allow the contents of the second compartment to be added to the liquid formed from the first compartment, in which the first compartment is located at the base of the container and the second compartment is located about the first compartment.

11. A beverage making apparatus as claimed in claim 10, in which the release means for the second compartment is remotely operable.

12. A beverage making apparatus as claimed in claim 10 in which the second compartment is a container having an exit orifice for the liquid contained within it, and the release means comprises a plug of material which is capable of being melted or removed through the action of a hot or boiling liquid acting on the plug.

13. A beverage making apparatus for receiving a liquid comprising a receptacle, a first compartment within the receptacle for holding a required quantity of a first constituent ingredient or ingredients, a second segregated compartment within the receptacle for holding a required quantity of a second constituent ingredient or ingredients, each compartment having a separate release means for allowing the contained ingredient or ingredients to be released into a separate vessel located underneath the container, the second compartment being adapted to house a liquid in a segregated and sealed manner, the release means comprising an element which is removable, releasable or breakable to allow the contents of the second compartment to be added to the liquid formed from the first compartment in which the second compartment is an annular shaped construction and the first compartment is located in the centre of the annulus.

14. A beverage making apparatus for preparing a hot beverage from pre-stored dry and liquid ingredients with hot water, comprising:

a housing having an open top and an open bottom with a first compartment storing dry ingredients and a second compartment storing a liquid, mounted between the top and bottom;

a water permeable barrier member is provided in the first compartment to permit hot water received from the open top to penetrate and dissolve the dry ingredients into a liquid solution;

a liquid direction unit is positioned between the first compartment and the second compartment to direct the liquid solution towards the second compartment; and a water soluble barrier member seals the liquid ingredient in the second compartment, whereby the liquid solution upon contact with the water soluble barrier member dissolves the barrier member to permit mixing of the liquid ingredient with the liquid solution to provide a drinkable beverage exiting from the open bottom.

15. The invention of claim 14, wherein the dry ingredients include coffee grounds and the liquid ingredients include a liquor.

16. The invention of claim 15, wherein the water soluble barrier member is a confectionery.

17. The invention of claim 16, wherein the confectionery is chocolate.

18. The invention of claim 14, wherein the liquid direction unit is a series of raised ribs on top of the second compartment.

19. The invention of claim 18, wherein the second compartment is tilted so that the water soluble barrier member is at a low position to permit a gravity feed of the stored liquid.

20. A method of making a beverage from an apparatus with pre-stored dry and liquid ingredients, comprising the steps of:

inserting the apparatus into a container for holding the beverage;

adding a predetermined amount of boiling water above the apparatus to initially dissolve the dry ingredients into a liquid solution;

directing the hot liquid solution to the stored liquid ingredient;

melting a soluble barrier member with the hot liquid solution to release the stored liquid ingredient; and mixing the liquid solution and liquid ingredient as it is released into the container, wherein a hot beverage is provided to the user.

\* \* \* \* \*